(12) United States Patent
Tan et al.

(10) Patent No.: US 6,600,833 B1
(45) Date of Patent: Jul. 29, 2003

(54) METHODOLOGY FOR COLOR CORRECTION WITH NOISE REGULATION

(75) Inventors: Yap-Peng Tan, Chandler, AZ (US); Tinku Acharya, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/359,831

(22) Filed: Jul. 23, 1999

(51) Int. Cl.$^7$ ................................................. G06K 9/00
(52) U.S. Cl. .......................... 382/167; 358/518; 348/612
(58) Field of Search .............................. 358/518–521; 382/162, 167; 348/234, 612

(56) References Cited

U.S. PATENT DOCUMENTS

| | | | | | |
|---|---|---|---|---|---|
| 5,081,529 | A | * | 1/1992 | Collette | 358/504 |
| 5,105,266 | A | * | 4/1992 | Telle | 358/505 |
| 5,475,769 | A | * | 12/1995 | Wober et al. | 348/242 |
| 5,508,826 | A | * | 4/1996 | Lloyd et al. | 347/19 |
| 5,539,522 | A | * | 7/1996 | Yoshida | 358/296 |
| 5,606,630 | A | * | 2/1997 | Maeda et al. | 358/518 |
| 5,740,333 | A | * | 4/1998 | Yoh et al. | 358/1.9 |
| 5,835,627 | A | * | 11/1998 | Higgins et al. | 382/167 |
| 5,987,167 | A | * | 11/1999 | Inoue | 358/518 |
| 6,008,912 | A | * | 12/1999 | Sato et al. | 358/518 |
| 6,075,888 | A | * | 6/2000 | Schwartz | 358/504 |
| 6,262,817 | B1 | * | 7/2001 | Sato et al. | 345/604 |
| 6,320,668 | B1 | * | 11/2001 | Kim | 358/1.1 |
| 6,343,146 | B1 | * | 1/2002 | Tsuruoka et al. | 382/163 |

OTHER PUBLICATIONS

"Evaluation of linear models of surface spectral reflectance with small number of parameters," Laurence T. Maloney, vol. 3, No. 10/Oct. 1986/J. Opt. Soc. Am. A (pp. 1673–1683).

"Constrained least–squares regresssiion in color spaces," Graham D. Finlayson, Journal of Electronic Imaging, vol. 6(4), Oct. 1997 (pp. 484–493).

"Water into Wine: Converting Scanner RGB to Tristimulus XYZ," Brian A. Wandell, et al., SPIE, vol. 1909, Oct. 1997 (pp. 92–101).

"Matrix Calculations for Digital Photography," Paul M. Hubel, et al., The Fifth Color Imaging Conference: Color Science, Systems, and Applications, Nov. 1997 (pp. 105–111).

"Graphic Technology and Photography –Colour characterisation of digital still cameras (DSCs) using colour targets and spectral illumination," WD 3.1 of ISO 17321, Mar. 19, 1999.

* cited by examiner

Primary Examiner—Amelia M. Au
Assistant Examiner—Anand Bhatnagar
(74) Attorney, Agent, or Firm—Blakely, Sokoloff, Taylor & Zafman LLP

(57) ABSTRACT

A method comprising determining an optimal color correction matrix accounting for both total noise variance and color reproduction error for a captured image; and correcting the colors of said captured image using said optimal color correction matrix.

17 Claims, 4 Drawing Sheets

METHODOLOGY FOR COLOR CORRECTION WITH NOISE REGULATION

BACKGROUND OF THE INVENTION

1. Field of the Invention

The invention relates generally to image processing. More specifically, the invention relates to correcting the color response of imaging devices.

2. Description of the Related Art

As the spectral sensitivities (reaction to light stimulus) of most color devices are typically different from that of human vision, signals from different color channels (such as Red, Green and Blue) of a device need to be mixed together in some proportion to generate color information suitable for display.

In order to share the correct color information in an open systems environment, the color response characteristics of the devices need to be known accurately. In device-independent color management approach, the goal is efficiently achieved by specifying the relation between the color space of each device and a common standard color space, such as the renowned 1931 CIE XYZ (2° observer) color space or 1976 CIE La*b* color space. Linear/nonlinear transformation or look-up-table (LUT) approach is usually used to specify such relation. The transformations or corresponding look-up tables are normally established by minimizing some error measure between the target and the transformed color coordinates over a large set of color patches. To be specific, let r be the N×1 vector consisting of equispaced samples of spectral reflectance or spectral transmittance of a color patch, $L_s$ the N×N diagonal matrix whose diagonal entries are the equispaced samples of spectral power distribution of the scene illuminant, and H the N×3 matrix whose columns are the sampled CIE XYZ color matching functions. The CIE XYZ tristimulus values q (3×1 vector) under scene illuminant $L_s$ can be computed as:

$$q = H^T L_s r \qquad (1)$$

Suppose that the overall spectral responsivity of the color device of interest can be represented by an N×K matrix D, where K is the total number of the device color channels and the $i^{th}$ column of matrix D is the sampled spectral responsivity of the $i^{th}$ device color channel. Under the device illuminant $L_d$, the device measurements, denoted as a K×1 vector p, of the color patch r can be written as:

$$p = D^T L_d r \qquad (2)$$

To specify the relation between the device and the CIE XYZ color spaces, a transformation T (or look-up table) is used to convert each device measurement into its corresponding CIE XYZ tristimulus values, i.e., $$q = T(p) \qquad (3)$$

As the spectral sensitivities of most color devices are not within a linear transformation from the CIE XYZ color matching function, a linear matrix type of transformation can only specifies the relationship between all p and q pairs in an approximate manner. Let M be such a 3×K matrix which transforms as accurately as possible each device measurement p into its corresponding CIE XYZ tristimulus values q. Typically, the color correction matrix M is obtained by minimizing the mean squares errors between the target CIE XYZ tristimulus values q and their prediction $\hat{q}=Mp$ over a rich set of color patches, i.e., $$e_c = \sum_p \|q - Mp\|^2 \qquad (4)$$

Let P be a K×V matrix whose columns are the device measurements from a set of V color patches and Q be a 3×V matrix whose columns are the corresponding CIE XYZ tristimulus values. Equation (4) is equivalent to $$\epsilon_c = tr([Q-MP]^T[Q-MP]) \qquad (4a)$$

where tr(·) is the matrix trace operator which is defined to be the sum of the diagonal elements of its matrix operand. By using least-squares technique, the color correction matrix $M_{LS}$ that minimizes the error $\epsilon_C$ can be computed as $$M_{LS} = QP^T[PP^T]^{-1} \qquad (5)$$

As the reproduced color error is the only concern in the minimization process, it does not take into account the effects of noise amplification after mixing the device measurements with the color correction matrix $M_{LS}$. To see this, let $\Sigma_d$ be the noise covariance matrix of the device measurement. From the results of error propagation in linear systems, it can be shown that, by using a 3×K matrix M to transform the device measurement into the CIE XYZ color space, the noise covariance matrix in CIE XYZ space, denoted as $\Sigma_x$, becomes $$\Sigma_x = M \Sigma_d M^T \qquad (6)$$

Furthermore, the CIE XYZ color space is normally used as an intermediate color connection space. To display the color of the device measurements in a particular output device, the CIE XYZ tristimulus values need to be converted to the color coordinates of the output device. For instance, to display on a CRT display, the CIE XYZ tristimulus values are usually converted to the RGB standard color space.

As the noise covariance matrices $\Sigma_x$ and $\Sigma_0$ are functions of M, the color correction matrix used to convert the device measurements to the color coordinates of the target device would have impacts on the noise levels of the output colors.

In particular, the diagonal elements of matrices $\Sigma_x$ and $\Sigma_0$ are noise variances of color channels in the respective color spaces. The larger the diagonal elements of matrices $\Sigma_x$ or $\Sigma_0$, the noisier (or more graininess) the color reproduced in the relative color channels of the target device. Although reproducing the measured color with good accuracy is an important goal, it shouldn't be done it a way that would over amplify the noise (or graininess) levels in the reproduced color. Today's electronic image sensors(such as CCD or CMOS) are subject to all manner of different noise such as quantum exposure noise, dark current noise, thermal noise, readout noise and so on, which will adversely impact image quality when color reproduction is high. Most of the color experience encountered in real life or imaging applications is relative sensation. There are occasions where accurate color reproductions are difficult or infeasible and, as a result, the noise level in the reproduced color becomes an important concern. For examples, color reproduction in low light or unknown illuminant environment. In the later case, auto white balance is usually required to reproduce the color, and it is hard to achieve great color accuracy if the illuminant color is not known a priori.

SUMMARY OF THE INVENTION

What is disclosed is a method for determining an optimal color correction matrix accounting for both total noise variance and color reproduction error for a captured image, and correcting the colors of the captured image using the optimal color correction matrix.

BRIEF DESCRIPTION OF THE DRAWINGS

The objects, features and advantages of the method and apparatus for the present invention will be apparent from the following description in which.

DETAILED DESCRIPTION OF THE INVENTION

Referring to the figures, exemplary embodiments of the invention will now be described. The exemplary embodiments are provided to illustrate aspects of the invention and should not be construed as limiting the scope of the invention. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Figure 1:
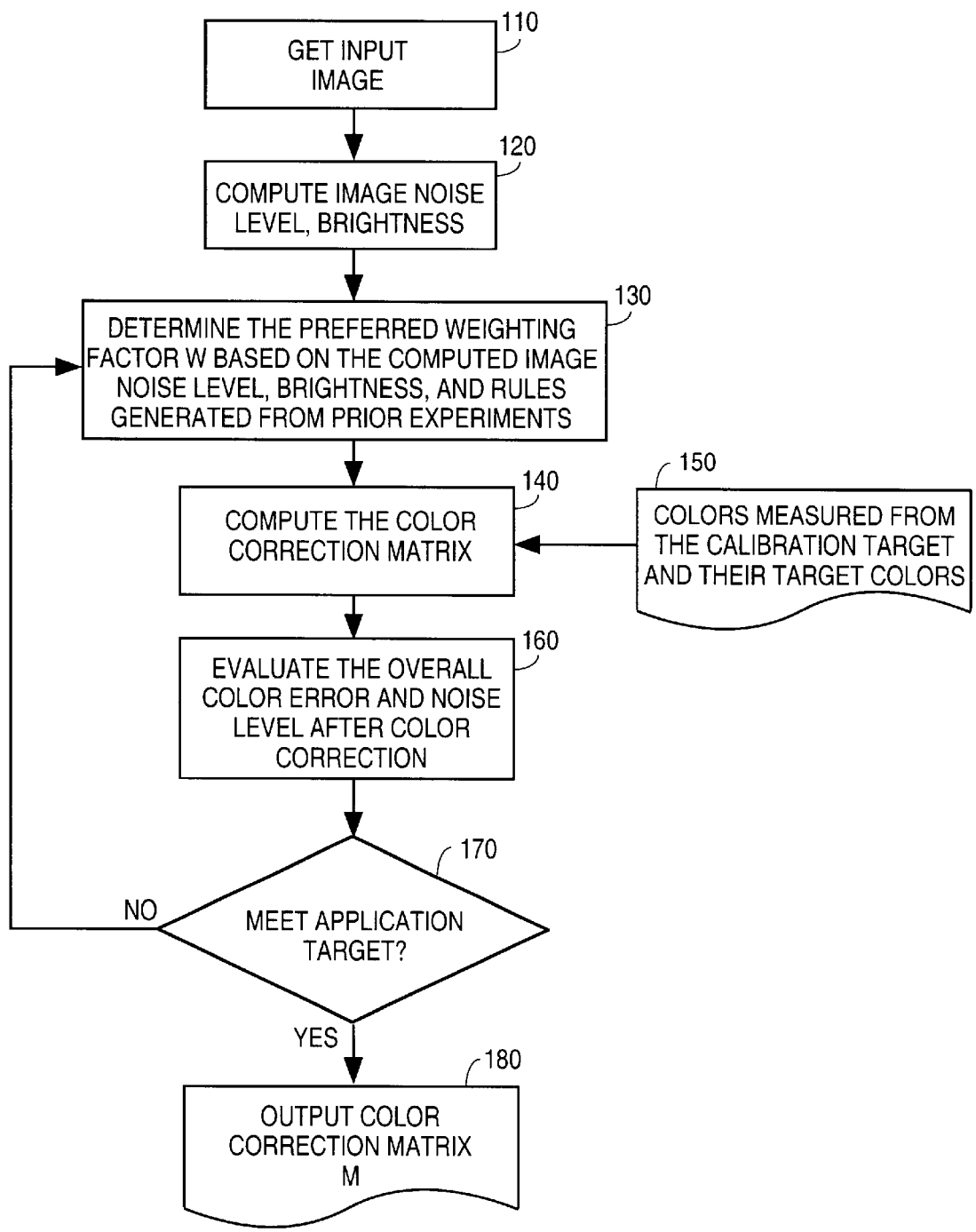
FIG. 1 is a flow diagram illustrating an embodiment of the invention.

FIG. 1 is a flow diagram illustrating an embodiment of the invention.

Color correction according to the various embodiments of the invention is carried out by minimizing a selected combination of the total color square error and total noise variance. Since characteristics vary from device to device, the selected combination should also be capable of varying. In applications/devices where noise level is high, color reproduction accuracy may be sacrificed (i.e., greater color error) in exchange for minimizing the level of noise (i.e., reducing the noise variance). The color correction matrix is thus a result of accounting for both noise and color accuracy. In still other embodiments of the invention, additional constraints may be introduced into the color correction matrix generation process such as the preservation of certain colors over others.

A color correction methodology is described in the flowchart of FIG. 1. First, an input image is fetched which is used as sampling data for computing the color correction matrix. This input image may be selected specifically to be color rich so that the sampling is comprehensive. After the image is fetched, it can be analyzed statistically. Accordingly, the image noise level and brightness are computed (block 120). Next, a weighting factor w is determined based upon the computed image noise level and computed image brightness as well any rules developed from other experiments (block 130). The weighting factor will essentially determine the level of the total noise variance and color reproduction error. In general, as w increases, the total noise variance will decrease and the total color error will increase (see formulation below). Using the weighting factor, a color correction matrix may be generated (block 140) in accordance, for example, with equation 10 below. An input to the matrix computation are the colors as measured from the calibration target and their target colors, i.e., colors to be reproduced (block 150).

After color correction is performed using the matrix generated as a result of block 140, the color error and noise level are evaluated. If the color error and noise level meet the target goals specified by the application (inspected at block 170), then the color correction matrix is output (block 180). If not, then a new weighting factor is determined and the process repeats at block 130. By modifying the preferred weighting factor based on the error and noise measurements as well as the brightness of the image, an optimal color correction matrix can be efficiently arrived at. The combination of the noise variance and color error can be expressed by the following cost function:

$$J = \varepsilon_C + w \cdot \varepsilon_N \qquad (7)$$
$$= tr([Q-MP]^T[Q-MP]) + w \cdot tr(NM\Sigma_d M^T N^T)$$

where $\Sigma_C$ and $\Sigma_N$ are the total color error and noise variance when the color correction matrix M is used, tr(·) is a matrix "trace" operator defined as the sum of the diagonal elements of a matrix, and w is a factor which properly weights these two error terms.

The goal is to find a color correction matrix M that will minimize the cost function J. To obtain an analytical solution of matrix M, by taking derivative of equation (7), setting it to zero, and after some mathematical manipulation, we arrive at $$\frac{\partial J}{\partial M} = -2QP^T + 2MPP^T + w \cdot (2N^T NM\Sigma_d) \qquad (8)$$
$$= 0$$

Rearranging equation (8), we have $$MPP^T + wN^T NM\Sigma_d = QP^T \qquad (9)$$

When $N=I_{3\times 3}$, that is, the performance in the CIE XYZ color space is of interest, the color correction matrix which minimizes the cost function J in equation (7) can be computed as $$M = QP^T[PP^T + w \cdot \Sigma_d]^{-1} \qquad (10)$$

where it is assumed that the matrix $(PP^T + w \cdot \Sigma_d)$ is nonsingular.

In general, the solution of matrix M to equation (9) can be computed as $$m = [PP^T \otimes I + \Sigma_d \otimes (w \cdot N^T N)]^{-1} v \qquad (11)$$

where m=vec(M) and v=vec(QP$^T$) and assuming that matrix (PP$^T \otimes$ I+$\Sigma_d \otimes$ N$^T$N) is nonsingular, where $\otimes$ is the Kronecker product operator between two matrices and vec(·) is a matrix operator which successively stacks the columns of an rxs matrix into a rs-dimensional column vector. Once the vector m is computed, the matrix M can be constructed from the elements of vector m.

It can be shown that when the weighting factor w in equation (7) increases, the total noise variance $\epsilon_N$ will decrease and the total color error $\epsilon_C$ will increase when the color correction matrix obtained from equation (11) is used. Let $M_w$ be the color correction matrix computed from equation (12) with weighting factor w. Notice that $M_0 = M_{LS}$ is the ordinary color correction matrix as defined in equation (5). From this formulation one can therefore design algorithms to compute the color correction matrix which can achieve the best tradeoff between the reproduced color error and total noise variance suitable for different applications.

Figure 2:
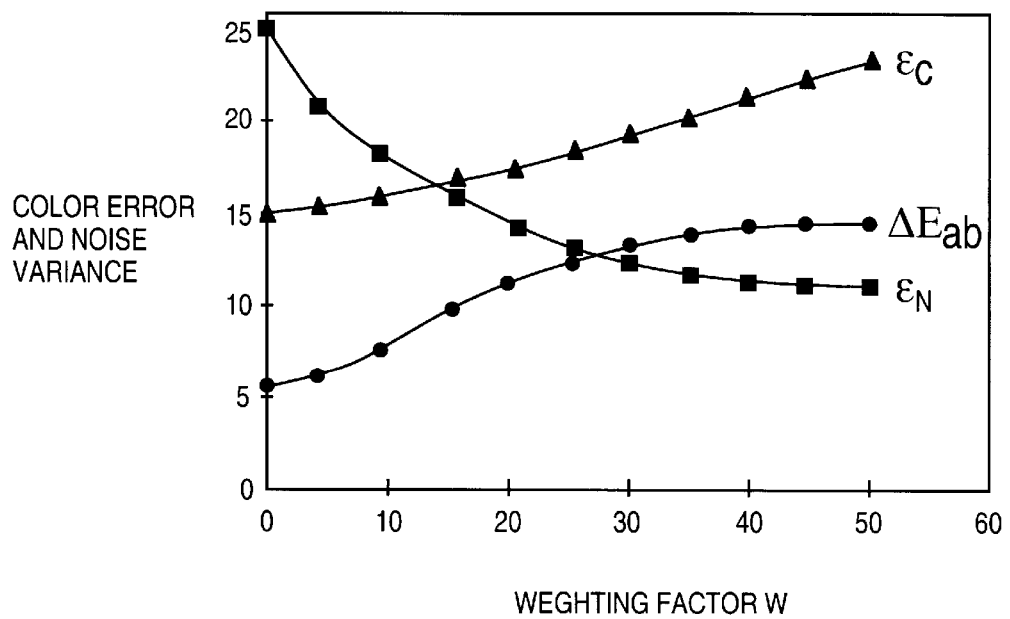
FIG. 2 illustrates the application of one or more embodiments of the invention.

FIG. 2 is a diagram of the relationship between weighting factor and color error/noise variance according to one or more embodiments of the invention.

FIG. 2 shows the results of a sequence of color patches captured from an image sensor and then corrected by color correction matrices with weighting factors w. There are three curves. The first labeled $E_{ab}$ is the average CIE LAB color error after color correction. The second curve is $\epsilon_C$ the mean square color error and the third is the $\epsilon_N$ the total noise variance.

The mean square color error shows almost a linear relation with the weighting factor w. The noise variance decreases in a parabolic relation with an increase in weighting factor and has a slope, in general, opposite that of the mean square color error. As the mean square color error increases, the noise variance decreases with an increase in the weighting factor.

Constraint-Modified Matrix Generation

The above formulation of a color correction matrix generated by considering both the total noise variance and color error may be modified by adding a constraint. One such constraint may be a color constraint that favors the retention of one or more of the color channels over the others. Such a constraint may be expressed by $$u = Mv \qquad (12)$$

where u is a 3 by 1 vector of the target colors (corresponding CIE XYZ tristimulus) that need to be reproduced in the device and v is a 3 by 1 vector of the device characteristic. With the constraint given equation 12, the modified color correction matrix can be obtained by minimizing the following constraint modified cost function J' of:

$$J' = tr([Q-MP]^T [Q-MP]) + w \cdot tr(NM\Sigma_d M^T N^T) - 2\Lambda [u-Mv] \qquad (13)$$

where $\Lambda$ is a 1 by 3 LaGrange multiplier vector. When N is a 3 by 3 identity matrix the closed form solution of a color correction matrix M for a minimized cost function J' can be shown to be:

$$M = PQ^T [QQ^T + w \cdot \Sigma_D]^{-1} - \frac{(PQ^T [QQ^T + w \cdot \Sigma_D]^{-1} v - u) v^T [QQ^T + w \cdot \Sigma_D]^{-1}}{v^T [QQ^T + w \cdot \Sigma_D]^{-1} v} \qquad (14)$$

Generating a color correction matrix M with the above solution in equation 14 can preserve the rendering of certain colors as desired while still allowing flexibility in trading color reproduction error versus noise variance.

Figure 3:
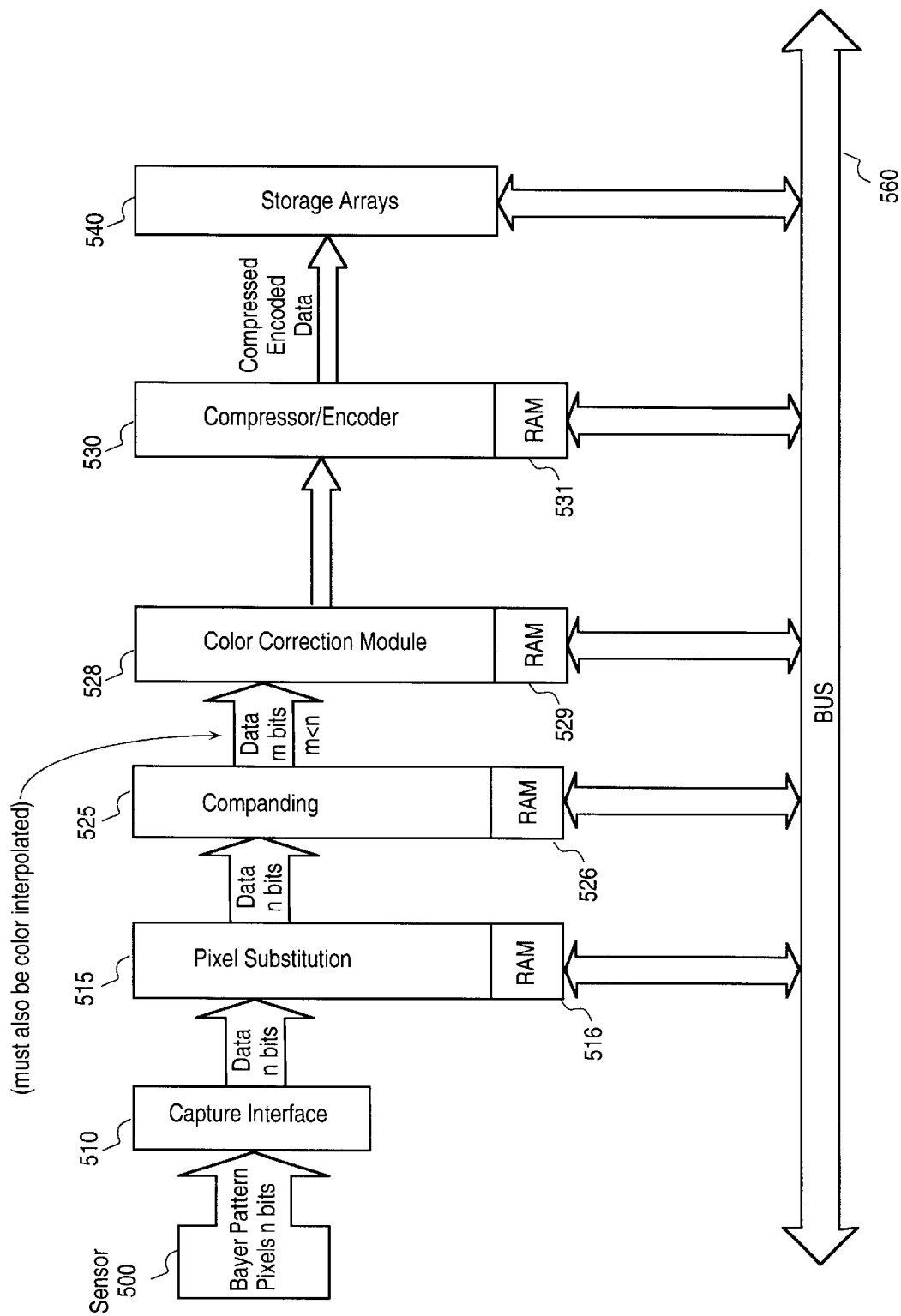
FIG. 3 is a block diagram of an image processing apparatus according to an embodiment of the invention.

FIG. 3 is a block diagram of an image processing apparatus according to an embodiment of the invention.

FIG. 3 is a block diagram of internal image processing components of an imaging device incorporating at least one embodiment of the invention including an adaptive encoder. In the exemplary circuit of FIG. 3, a sensor 500 generates pixel components which are color/intensity values from some scene/environment. The M-bit pixel values generated by sensor 500 are sent to a capture interface 510. Sensor 500 in the context relating to the invention will typically sense one of either R, G, or B components from one "sense" of an area or location. Thus, the intensity value of each pixel is associated with only one of three color planes and may form together a Bayer pattern raw image. Capture interface 610 resolves the image generated by the sensor and assigns intensity values to the individual pixels. The set of all such pixels for the entire image is in a Bayer pattern in accordance with typical industry implementation of digital camera sensors.

It is typical in any sensor device that some of the pixel cells in the sensor plane may not respond to the lighting condition in the scene/environment properly. As a result, the pixel values generated from these cell may be defective. These pixels are called "dead pixels." The "pixel substitution" unit 515 replaces each dead pixel by the immediate previously valid pixel in the row. A RAM (Random Access Memory) 516 consists of the row and column indices of the dead pixels, which are supplied by the sensor. This RAM 516 helps to identify the location of dead pixels in relation to the captured image. The image sensor often gives a higher resolution than industry standard (e.g., 9 bits instead of 8) and thus a companding module 525 may be used to convert the M-bit pixels to N-bit pixels where M>N. Again a RAM 526 may aid in this conversion process.

This companded sensor data may then be passed to a color interpolation module (not shown) which interpolates the missing R, G or B components at each pixel location based on some heuristic. Each color interpolated pixel will have full color information, which involves all three components, Red, Green and Blue, in various proportions. Color interpolated data is then passed to a Color Correction module 528 which executes color correction upon the captured image by taking into account both total noise variance within the sensor and color reproduction error. Module 528 may either act in real-time by implementing directly the computation for the adjustment/enhancement process outlined above including application-specific constraints that may be loaded via bus 560 from an external device. Such a look-up table which already maps all possible intensity values to corresponding enhanced/adjusted values may be stored in a RAM 531 that can be accessed with reference to the companded data values used as addresses or offsets to addresses for RAM 531.

A compressor/encoder 530 receives sensor image data and performs image compression and binary encoding. A RAM 531 can be used to store coefficients and/or quantization thresholds as desired in executing these compression techniques. Compressor/encoder 530 reduces the total size of the image data by exploiting factors such as data correlation. Compressed/encoded data can then be stored in storage arrays 540.

Each of the RAM tables 516, 526, 531 and 529 can directly communicate with a bus 560 so that their data can be loaded and then later, if desired, modified. Further, those RAM tables and other RAM tables may be used to store intermediate result data as needed and may be part of the same physical memory space even though depicted in FIG. 3 as being distinct.

Figure 4:
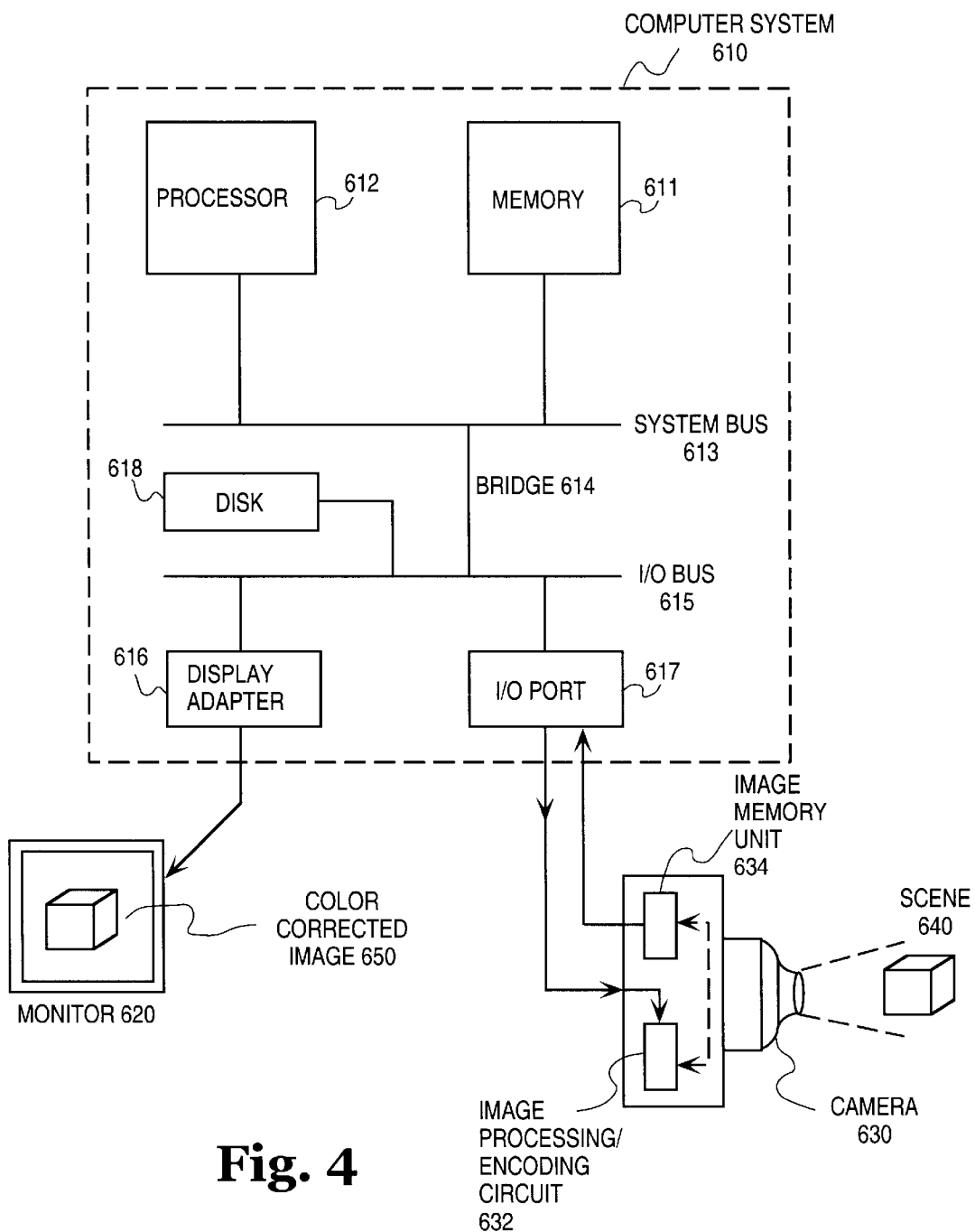
FIG. 4 is a system diagram of one embodiment of the invention.

FIG. 4 is a system diagram of one embodiment of the invention.

Illustrated is a computer system 610, which may be any general or special purpose computing or data processing machine such as a PC (personal computer), coupled to a camera 630. Camera 630 may be a digital camera, digital video camera, or any image capture device or imaging system, or combination thereof and is utilized to capture an image of a scene 640. Essentially, captured images are processed by an image processing circuit 632 so that they can be efficiently stored in an image memory unit 634, which may be a ROM, RAM or other storage device such as a fixed disk. The image contained within image memory unit 634 that is destined for computer system 610 can be according to one embodiment of the invention, color corrected with respect to both the total noise variance and color reproduction error as well as constrained to retain certain colors over others. In most digital cameras that can perform still imaging, images are stored first and downloaded later. This allows the camera 630 to capture the next object/scene quickly without additional delay. The invention in its various embodiments, particularly in providing a compressed image that is directly color corrected on-camera enhances the quality of images generated by camera 630.

The image processing circuit 632 may carry out color correction prior to the images being downloaded from camera 630. This prevents any loss from the compression process from being introduced before color correction which may adversely impact image quality. When a color corrected image has been compressed is downloaded to computer system 610, it may be decoded and then rendered to some output device such as a printer (not shown) or to a monitor device 620. Image decoding and rendering may be achieved using a processor 612 such as the Pentium™ (a product of Intel Corporation) Processor and a memory 611, such as RAM, which is used to store/load instruction addresses and result data.

Where image processing circuit 632 utilizes a look-up table to obtain the color correction matrices, the matrix generation techniques described above may be achieved in a software application running on computer system 610 rather than directly in camera 630. The color correction may then be loaded into camera 630 or may operate even upon a decompressed image after download to computer system 610. In such an embodiment, the image processing circuit may advantageously store only the color correction matrix and thus be relieved of the computational duty involved in generating the matrix. The application(s) used to perform the matrix generation and application thereof for color correction after download from camera 630 may be from an executable compiled from source code written in a language such as C++. The instructions of such executable/source files may be stored to a disk 618 or memory 611. Further, such application software may be distributed on a network or a computer-readable medium for use with other systems. In yet another embodiment, the entire color correction technique may be performed on the computer system 610, with a generated color correction matrix stored in disk 618, memory 611 or by implementing the process of FIG. 3, which is a real-time method on computer system 610 by use of application software executed thereon.

When an image, such as an image of a scene 640, is captured by camera 630, it is sent to the image processing circuit 632. Image processing circuit 632 consists of ICs and other components which can be adapted to generate a color correction matrix and/or apply such a matrix for color correcting a captured image. The image memory unit 634 will store the compressed and encoded data. Once all pixels are processed and stored or transferred to the computer system 610 for rendering the camera 630 is free to capture the next image. When the user or application desires/requests a download of images, the encoded image data in the image memory unit, are transferred from image memory unit 634 to the I/O port 616. I/O port 617 uses the bus-bridge hierarchy shown (I/O bus 615 to bridge 614 to system bus 613) to temporarily store the data into memory 611 or, optionally, disk 618. Computer system 610 has a system bus 613 which facilitates information transfer to/from the processor 612 and memory 611 and a bridge 614 which couples to an I/O bus 615. I/O bus 615 connects various I/O devices such as a display adapter 616, disk 618 and an I/O port 617, such as a serial port. Many such combinations of I/O devices, buses and bridges can be utilized with the invention and the combination shown is merely illustrative of one such possible combination.

The result of this color correction is a color corrected image 650 which shows accurate color reproduction. The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

What is claimed is:

1. A method comprising:
   determining an optimal color correction matrix accounting for both total noise variance and color reproduction error for a captured image; wherein the total noise variance comprises summation of diagonal elements of a matrix and
   correcting the colors of said captured image using said optimal color correction matrix.

2. A method according to claim 1 wherein said determining includes:
   determining a preferred weighting factor that properly weights the level of color reproduction error and total noise variance.

3. A method according to claim 2 wherein determining a preferred weighting factor includes:
   fetching a sample image;
   computing a sample image pre-correction noise level; and
   computing a sample image pre-correction brightness level.

4. A method according to claim 3 wherein said preferred weighting factor is determined based upon said pre-correction noise level and said pre-correction brightness level.

5. A method according to claim 1 wherein said captured image results from an optical sensing system.

6. A method comprising:
   determining an optimal color correction matrix accounting for both total noise variance and color reproduction error for a captured image;
   wherein said determining an optimal color correction matrix includes determining a preferred weighting factor that properly weights the level of color reproduction error and total noise variance;
   wherein said determining a preferred weighting factor includes:
   generating a test color correction matrix using said preferred weighting factor;
   applying said test color correction matrix to said sample image; and
   evaluating the color error and a post-correction noise level after said application of said test color correction matrix to said sample image; and correcting the colors of said captured image using said optimal color correction matrix.

7. A method according to claim 6 wherein if said color error and said post-correction noise level meet an application target, then setting the optimal color correction matrix to be said test color correction matrix.

8. A method according to claim 7 wherein if said color error and said post-correction noise level do not meet an application target, then determining a new preferred weighting factor and repeating the steps of generating of a test color correction matrix, of applying and of evaluating.

9. A method according to claim 7 further comprising:
   outputting said optimal color correction.

10. A method according to claim 6 wherein generating of a test color correction matrix includes minimizing of a cost function which inter-relates said noise variance with said color reproduction error via said weighting factor.

11. An article comprising a computer readable medium having instructions stored thereon which when executed causes:
    determining an optimal color correction matrix accounting for both total noise variance and color reproduction error for a captured image; wherein the total noise variance comprises summation of diagonal elements of a matrix and
    correcting the colors of said captured image using said optimal color correction matrix.

12. An article according to claim 11 wherein determining includes considering a color reproduction constraint upon said color correction.

13. The article of claim 11, wherein said determining an optima color correction matrix includes determining a preferred weighting factor that properly weights the level of color reproduction error and total noise variance;

wherein said determining a preferred weighting factor includes:

generating a test color correction matrix using said preferred weighting factor;

applying said test color correction matrix to said sample image; and evaluating the color error and a post-correction noise level after said application of said test color correction matrix to said sample image.

14. A system comprising:

a memory configured to store instructions and data; and a processor coupled to said memory said processor adapted to execute said instructions in conjunction with said data to cause:

determining an optimal color correction matrix accounting for both total noise variance and color reproduction error for a captured image; wherein the total noise variance comprises summation of diagonal elements of a matrix and correcting the colors of said captured image using said optimal color correction matrix.

15. A system according to claim 14 comprising an imaging apparatus, said imaging apparatus providing said captured image, said captured image corrected on said imaging apparatus.

16. A system according to claim 15 wherein said optimal color correction matrix is loaded into said imaging apparatus.

17. The system of claim 14, wherein said determining an optimal color correction matrix includes determining a preferred weighting factor that properly weights the level of color reproduction error and total noise variance; and wherein said determining a preferred weighting factor includes:

generating a test color correction matrix using said preferred weighting factor;

applying said test color correction matrix to said sample image; and evaluating the color error and a post-correction noise level after said application of said-test color correction matrix to said sample image.

* * * * *